United States Patent
Matsumoto

(10) Patent No.: US 8,036,516 B2
(45) Date of Patent: Oct. 11, 2011

(54) RECORDING AND REPRODUCING APPARATUS

(75) Inventor: Shinsuke Matsumoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1640 days.

(21) Appl. No.: 11/133,323

(22) Filed: May 20, 2005

(65) Prior Publication Data

US 2005/0259969 A1    Nov. 24, 2005

(30) Foreign Application Priority Data

May 21, 2004    (JP) .............................. P2004-152247

(51) Int. Cl.
*H04N 5/92*    (2006.01)
*H04N 5/917*    (2006.01)
*H04N 5/84*    (2006.01)
*H04N 5/89*    (2006.01)
*H04N 7/14*    (2006.01)
*H04N 5/225*    (2006.01)
*H04N 5/222*    (2006.01)

(52) U.S. Cl. ........ 386/326; 386/329; 386/331; 386/332; 386/333; 348/14.14; 348/220.1; 348/333.03

(58) Field of Classification Search .................... 386/52, 386/55, 65, 88, 95, 124–126, 326, 329, 331, 386/332, 333; 348/14.14, 220.1, 333.03
See application file for complete search history.

(56) References Cited

U.S. PATENT DOCUMENTS

| | | | | |
|---|---|---|---|---|
| 6,285,826 | B1 * | 9/2001 | Murase et al. | 386/125 |
| 6,289,165 | B1 * | 9/2001 | Abecassis | 386/46 |
| 6,728,170 | B2 * | 4/2004 | Ueki | 369/32.01 |
| 6,839,504 | B1 * | 1/2005 | Gotoh et al. | 386/111 |
| 2001/0041049 | A1 * | 11/2001 | Kanda | 386/52 |
| 2002/0135607 | A1 * | 9/2002 | Kato et al. | 345/716 |

FOREIGN PATENT DOCUMENTS

| | | |
|---|---|---|
| JP | 2002-140865 | 5/2002 |
| JP | 2002-157861 | 5/2002 |
| JP | 2003-264793 | 9/2003 |

* cited by examiner

*Primary Examiner* — Thai Tran
*Assistant Examiner* — Daquan Zhao
(74) *Attorney, Agent, or Firm* — Morgan, Lewis & Bockius LLP

(57) ABSTRACT

A recording and reproducing apparatus includes an information recording unit that generates reproduction range information indicating the range of image signals to be reproduced as moving picture and that records it on an optical disk. When representative images representing contents of the image signals recorded on the optical disk are displayed, the representative images are displayed as moving picture obtained by reproducing the image signals recorded on the optical disk based on the reproduction range information.

5 Claims, 10 Drawing Sheets

FIG. 7A

| | | |
|---|---|---|
| | MODE INFORMATION | 1 |
| FIRST INFORMATION | PROGRAM NUMBER | 1 |
| SECOND INFORMATION | ENTRY POINT NUMBER | – |
| THIRD INFORMATION | PTM INDICATING STARTING POSITION | – |
| | PTM INDICATING ENDING POSITION | – |

FIG. 7B

| | | |
|---|---|---|
| | MODE INFORMATION | 2 |
| FIRST INFORMATION | PROGRAM NUMBER | 1 |
| SECOND INFORMATION | ENTRY POINT NUMBER | 2 |
| THIRD INFORMATION | PTM INDICATING STARTING POSITION | – |
| | PTM INDICATING ENDING POSITION | – |

FIG. 7C

| | | |
|---|---|---|
| | MODE INFORMATION | 3 |
| FIRST INFORMATION | PROGRAM NUMBER | 2 |
| SECOND INFORMATION | ENTRY POINT NUMBER | – |
| THIRD INFORMATION | PTM INDICATING STARTING POSITION | T1 |
| | PTM INDICATING ENDING POSITION | T2 |

FIG. 8A

|  |  |
|---|---|
| MODE INFORMATION | 1 |
| PROGRAM CHAIN NUMBER | 3 |
| ENTRY POINT NUMBER | – |
| PTM INDICATING STARTING POSITION | – |
| PTM INDICATING ENDING POSITION | – |

- FIRST INFORMATION → PROGRAM CHAIN NUMBER
- SECOND INFORMATION → ENTRY POINT NUMBER
- THIRD INFORMATION → { PTM INDICATING STARTING POSITION, PTM INDICATING ENDING POSITION }

FIG. 8B

|  |  |
|---|---|
| MODE INFORMATION | 2 |
| PROGRAM CHAIN NUMBER | 3 |
| ENTRY POINT NUMBER | 2 |
| PTM INDICATING STARTING POSITION | – |
| PTM INDICATING ENDING POSITION | – |

- FIRST INFORMATION → PROGRAM CHAIN NUMBER
- SECOND INFORMATION → ENTRY POINT NUMBER
- THIRD INFORMATION → { PTM INDICATING STARTING POSITION, PTM INDICATING ENDING POSITION }

RECORDING AND REPRODUCING APPARATUS

BACKGROUND OF THE INVENTION

1. Field of the Invention

The present invention relates to a recording and reproducing apparatus that records image signals on an optical disk and that reproduces the image signals recorded on the optical disk, and more particularly, to a recording and reproducing apparatus capable of displaying representative images such as thumbnail images that represent contents of the image signals recorded on the optical disk as moving pictures.

In DVD players that have widely been used in recent years, the MPEG2 standard has been used to compress image signals. The image signal compressing method according to the MPEG standard is adopted to a Video Recording format (VR format), which is a standard of a DVD recorder capable of converting analog image signals into digital signals and of recording the digital signal on an optical disk. As such, in the VR format enabling image signals to be recorded as digital signals, the recorded image signals are managed in two kinds of formats, that is, an original program chain format and a user-defined program chain (play list). In addition, it is possible to designate a still picture representing a program, which is the unit of the image signals in the original program chain, as a representative picture. Therefore, when thumbnail images indicating the contents of a program are displayed, the still picture designated as the representative picture is displayed (first related art).

Meanwhile, as a technique of expanding the VR format, the following related art has been proposed (second related art) That is, according to this technique, only in a driver (information recording/reproducing apparatus) manufactured by a specific maker, a peculiar function other than the function prescribed by the above-mentioned standard is exhibited, and specific information 2002 that can be used by only the specific maker can be recorded in a recording area when information on the peculiar function is recorded on an information recording medium (optical disk 1001). The specific information 2002 that can be used by only the specific maker is recorded on an area of the information recording medium (the optical disk 1001) different from an area where common information 2001 according to the standard is recorded. Information related to the contents of image information, still picture information, voice information, etc., included in the information that can be reproduced only by the driver manufactured by the specific maker is defined by specific object information 2008 that can be used by a specific maker. Information required for managing and controlling the specific object information (specific content information) 2008 that can be used only by the specific maker is defined by management and control information 2006 that can be used only by a specific maker (for example, see JP-A-2002-140865 (paragraph 0193 and FIG. 12)).

Further, the following technique has been proposed (third related art). That is, according to this technique, in order to provide a data structure (format structure) in which image information, still picture information, and/or voice information can be recorded on the same information recording medium by mixture and in which an arbitrary area of each of the image information, the still picture information, and the voice information can be randomly reproduced, similar to image information in the existing RTR standard, cell Nos. 2, 3, and 6 are defined by designating a reproducing range from a starting position to an ending position of each of audio VOB (AOB) Nos. A to C. In addition, the voice information (the audio VOB Nos. A to C) and a cell No. 1 designating a reproduction range from a starting position to an ending position of the image information (a movie VOB 31) or a cell No. 4 designating a reproduction range from a starting position to an ending position of the still picture information (a still picture VOB 21) are treated exactly as the same string (for example, see JP-A-2002-157861 (paragraphs 0004 and 0022)).

Furthermore, the following technique has been disclosed (fourth related art). That is, according to this technique, a moving picture, an audio, and a still picture are respectively treated in a user-defined program unit, and it is possible to integrally reproduce the moving picture, the audio, and the still picture by displaying the reproduction order of the user-defined programs on the play list (for example, see JP-A-2003-264793 (paragraph 0074 and FIG. 5)).

SUMMARY OF THE INVENTION

However, when the first related art is used, the following problems arise. That is, for example, in a case in which still pictures respectively indicating programs of an original program chain are displayed in order to know the contents of image signals recorded on a DVD, when a proper still picture is not extracted, it is difficult to grasp the contents of the program from the displayed still picture. In addition, a user may feel the monotone of a screen having only a plurality of still pictures displayed thereon by the contents of the still pictures, and thus it is required screen display for getting rid of the monotone.

In addition, the second related art disclose only an information recording structure when a peculiar function other than the function prescribed by the above-mentioned standard is exhibited in a driver (information recording/reproducing apparatus) manufactured by a specific maker. Therefore, it is difficult to apply the technique disclosed in the second related art in order to solve the problems of the first related art, that is, the problems in that it is difficult to grasp the contents of a program from a displayed still picture, and in that the displayed screen is felt monotonously.

Further, the third related art discloses only the data structure (format structure) in which the image information, the still picture information, and/or the voice information can be recorded on the same information recording medium in mixture and in which an arbitrary area of each of the image information, the still picture information, and the voice information can be randomly reproduced. Therefore, it is difficult to apply the technique disclosed in the third related art in order to solve the problems of the first related art, that is, the problems in that it is difficult to grasp the contents of a program from a displayed still picture, and in that the displayed screen is felt monotonously.

Furthermore, the fourth related art discloses a technique capable of integrally reproducing the moving picture, the audio, and the still picture. Therefore, it is difficult to apply the technique disclosed in the fourth related art in order to solve the problems of the first related art, that is, the problems in that it is difficult to grasp the contents of a program from a displayed still picture, and in that the displayed screen is felt monotonously.

The present invention has been made to solve the above-mentioned problems, and it is an object of the invention to provide a recording and reproducing apparatus capable of solving the difficulty in grasping the contents of a recorded program and the monotone in displaying an image representing the contents of the recorded program, of simply designating the reproduction range of a moving picture, of preventing a displayed screen from being felt monotone when a plurality of thumbnail images is displayed, and of causing an apparatus not using reproduction range information to use an optical disk having the reproduction range information recorded thereon.

In addition, it is another object of the invention to provide a recording and reproducing apparatus capable of, when representative images that represent contents of image signals recorded on an optical disk are displayed, solving the difficulty in grasping the contents of a recorded program and the monotone in displaying the representative images representing the contents of the recorded image signals, by changing the representative images into moving pictures.

Further, it is still another object of the invention to provide a recording and reproducing apparatus capable of simply designating the reproduction range of a moving picture using a title (a program of an original program chain or a program chain of a user-defined program chain), a chapter (a cell of a program or program chain), or time information (PTM).

Furthermore, it is yet still another object of the invention to provide a recording and reproducing apparatus capable of preventing the display of a plurality of thumbnail images from being felt monotone, by displaying a plurality of representative images selected by a user as moving pictures when the plurality of representative images are displayed.

Moreover, it is still yet another object of the invention to provide a recording and reproducing apparatus capable of causing an optical disk having reproduction range information recorded thereon to be used by an apparatus not using the reproduction range information, by making an area where expansion information is recorded be displayed as an empty area in volume/file structure information that indicates the state of use of a data area.

In order to achieve the above objects, according to an aspect of the invention, a recording and reproducing apparatus includes a tuner unit that receives commercial broadcasting signals; and an information recording unit that generates reproduction range information, which is information indicating the range of image signals recorded on an optical disk and the range of image signals to be reproduced as a moving picture, and that records it on the optical disk, so that the recording and reproducing apparatus records the image signals output from the tuner unit on the optical disk, based on a VR format and reproduces the image signals recorded on the optical disk, based on the VR format. In the recording and reproducing apparatus, when representative images representing contents of the image signals recorded on the optical disk are displayed, the representative images are moving pictures obtained by reproducing the image signals recorded on the optical disk based on the reproduction range information recorded on the optical disk. In addition, the reproduction range information includes first information that indicates a program of an original program chain or a program chain of a user-defined program chain; second information that indicates an entry point of the program of the original program chain or an entry point of the program chain of the user-defined program chain; third information that has a reproduction starting position and a reproduction ending position as time information; and mode information that indicates which of the first and third information is used. When the mode information indicates the first information, a range corresponding to the first information is reproduced. When the mode information indicates the second information, a range corresponding to the second information is reproduced. When the mode information indicates the third information, a range corresponding to the third information is reproduced. When a plurality of representative images are displayed, one of the displayed representative images selected by a user is a moving picture. The information recording unit records the reproduction range information in a predetermined area of a data area, and an area where the reproduction range information is recorded is displayed as an empty area in volume/file structure information, which is information indicating the state of use of the data area.

That is, when a range indicated by the reproduction range information is a range indicating the contents of the image signals corresponding to the representative image to be changed into a moving picture, the contents of the recorded image signals are displayed as the moving picture with high quality, thereby varying the screen. In addition, it is possible to designate a range in which a program of the original program chain or a program chain of the user-defined program chain is used as a unit, a range in which a cell is used as a unit, or a time range. Further, even if a plurality of representative images is displayed, it is possible to change one representative image into a moving picture. Furthermore, it is possible to allow an apparatus using reproduction range information to know the recording position of the reproduction range informational though the reproduction range information is not recorded in the volume/file structure information. On the other side, when the reproduction range information is recorded, it is possible to allow an apparatus not using the reproduction range information to determine that the reproduction range information is not recorded.

Further, the invention is applied to a recording and reproducing apparatus that records image signals on an optical disk and that reproduces the image signals recorded on the optical disk. The recording and reproducing apparatus includes an information recording unit that generates reproduction range information, which is information indicating the range of the image signals recorded on the optical disk and the range of the image signals to be reproduced as a moving picture, and that records it on the optical disk. When representative images representing contents of the image signals recorded on the optical disk are displayed, the representative images are moving pictures obtained by reproducing the image signals recorded on the optical disk based on the reproduction range information recorded on the optical disk.

That is, when a range indicated by the reproduction range information is a range indicating the contents of the image signals corresponding to the representative image to be changed into a moving picture, the contents of the recorded image signals are displayed as the moving picture with high quality, thereby varying the screen.

Furthermore, in addition to the above-mentioned structure, the image signals are recorded on the optical disk based on a VR format, and the reproduction range information includes first information that indicates a program of an original program chain or a program chain of a user-defined program chain; second information that indicates an entry point of the program of the original program chain or an entry point of the program chain of the user-defined program chain; third information that has a reproduction starting position and a reproduction ending position as time information; and mode information that indicates which of the first and third information is used. In addition, when the mode information indicates the first information, a range corresponding to the first information is reproduced. When the mode information indicates the second information, a range corresponding to the second information is reproduced. Further, when the mode information indicates the third information, a range corresponding to the third information is reproduced.

That is, according to the above-mentioned structure, it is possible to designate a range in which a program of the original program chain or a program chain of the user-defined program chain is used as a unit, a range in which a cell is used as a unit, or a time range.

Moreover, in addition to the above-mentioned structure, when a plurality of representative images are displayed, one of the displayed representative images selected by a user is a moving picture. That is, even if the plurality of representative images are displayed, it is possible to change one representative image into a moving picture.

In addition to the above-mentioned structure, the information recording unit records the reproduction range information in an area located at an innermost circumferential portion of an empty data area in volume/file structure information, which is information indicating the state of use of the data area, and the area where the reproduction range information is recorded is displayed as an empty area in the volume/file structure information. That is, it is possible to allow an apparatus using reproduction range information to know the recording position of the reproduction range information although the reproduction range information is not recorded in the volume/file structure information. On the other side, when the reproduction range information is recorded, it is possible to allow an apparatus not using the reproduction range information to determine that the reproduction range information is not recorded.

As described above, according to the invention, when a range indicated by the reproduction range information is a range indicating the contents of the image signals corresponding to the representative image to be changed into a moving picture, the contents of the recorded image signals are displayed as the moving picture with high quality, thereby varying the screen. In addition, it is possible to designate a range in which a program of the original program chain or a program chain of the user-defined program chain is used as a unit, a range in which a cell is used as a unit, or a time range. Further, even if a plurality of representative images is displayed, it is possible to change one representative image into a moving picture. Furthermore, it is possible to allow an apparatus using reproduction range information to know the recording position of the reproduction range information although the reproduction range information is not recorded in the volume/file structure information. On the other side, when the reproduction range information is recorded, it is possible to allow an apparatus not using the reproduction range information to determine that the reproduction range information is not recorded. In this way, it is possible solve problems in that there is difficulty in grasping the contents of recorded programs and the display of images representing the contents of the recorded programs is felt monotonously, and it is also possible to simply designate the reproduction range of a desired moving picture. In addition, when a plurality of thumbnail images is displayed, it is possible to prevent a display screen from being felt monotone. Further, it is possible to allow an apparatus not using the reproduction range information to use an optical disk having the reproduction range information recorded thereon.

Furthermore, according to the invention, when a range indicated by the reproduction range information is a range indicating the contents of the image signals corresponding to the representative image to be changed into a moving picture, the contents of the recorded image signals are displayed as the moving picture with high quality, thereby varying the screen.

Moreover, it is possible to designate a range in which a program of the original program chain or a program chain of the user-defined program chain is used as a unit, a range in which a cell is used as a unit, or a time range. Thus, it is possible to simply designate the reproduction range of a desired moving picture.

Further, even if a plurality of representative images is displayed, it is possible to change one representative image into a moving picture. Therefore, when a plurality of thumbnail images is displayed, it is possible to prevent a display screen from being felt monotone.

Furthermore, it is possible to allow an apparatus using reproduction range information to know the recording position of the reproduction range information although the reproduction range information is not recorded in the volume/file structure information. On the other side, when the reproduction range information is recorded, it is possible to allow an apparatus not using the reproduction range information to determine that the reproduction range information is not recorded. Thus, the reproduction range information can be used by an apparatus not using the reproduction range information.

BRIEF DESCRIPTION OF THE DRAWINGS

FIGS. 7A to 7C are explanatory diagrams illustrating an example of reproduction range information generated according to an original program chain;

FIGS. 8A and 8B are explanatory diagrams illustrating an example of reproduction range information generated according to a user-defined program chain;

DETAILED DESCRIPTION OF THE PREFFERED EMBODIMENTS

Preferred embodiments of the present invention will now be described with reference to the accompanying drawings.

First, reproduction range information generated in an embodiment of the invention will be described. The reproduction range information is information that is not prescribed in a VR format and that is referred when a moving picture, not a still picture, is used, as a representative image, such as a thumbnail image, indicating the contents of image signals recorded on a DVD (an optical disk) in a case in which the representative image is displayed. That is, the reproduction range information is information indicating which portion of the image signals recorded on the optical disk should be reproduced when the moving picture, which is a representative image, is reproduced.

Further, the VR format is a format prescribed by a standard specification "DVD Specifications for Rewritable/Re-recordable Discs, Part 3 VIDEO RECORDING, Version 1.0".

Figure 4A:
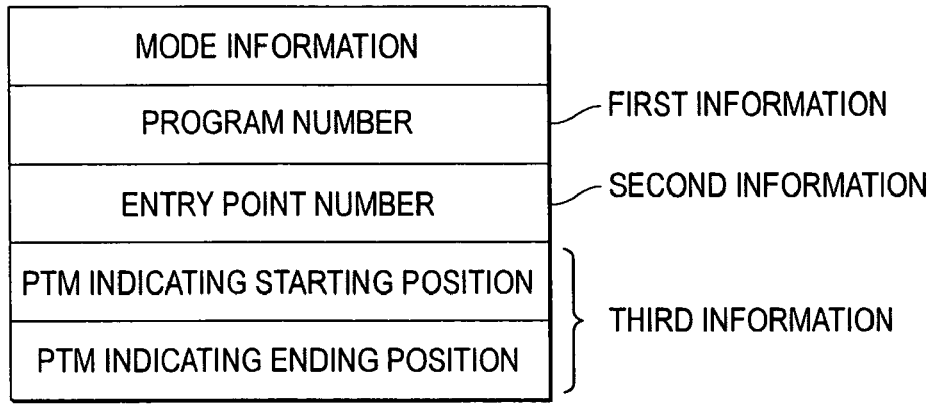
FIGS. 4A to 4C are explanatory diagrams illustrating a structure of reproduction range information.

Returning to the detailed description of the reproduction range information again, when an original program chain is a target, the reproduction range information is composed of first information indicating a program number of the original program chain, second information indicating an entry point number in a program of the original program chain, third information having a starting position and an ending position of the program indicated by the first information as time information (which is represented by Presentation Time (hereinafter, referred to as PTM) that is a unit obtained by dividing one second by 90,000), and mode information indicating which of the first to third information is used, as shown in FIG. 4A.

Figure 4B:
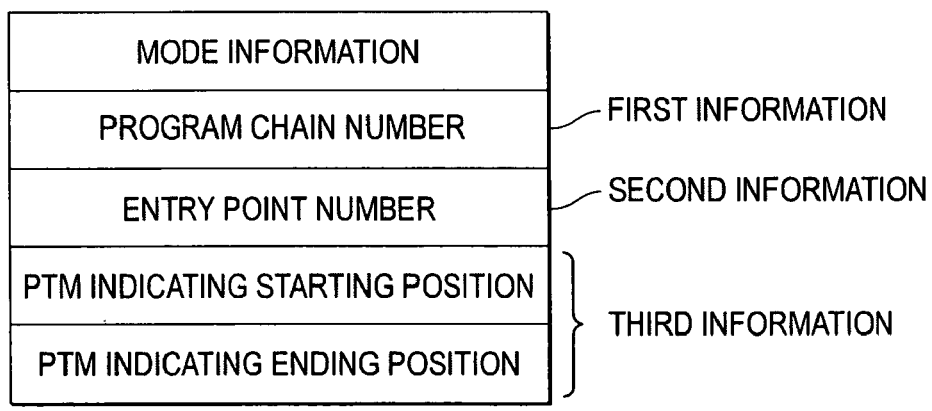

Furthermore, when a user-defined program chain is a target, the reproduction range information is composed of first information indicating a program number of the user-defined program chain, second information indicating an entry point number in a program of the user-defined program chain, third information having a starting position and an ending position of the program chain indicated by the first information as time information (which is represented by PTM), and mode information indicating which of the first to third information is used, as shown in FIG. 4B.

Figure 4C:
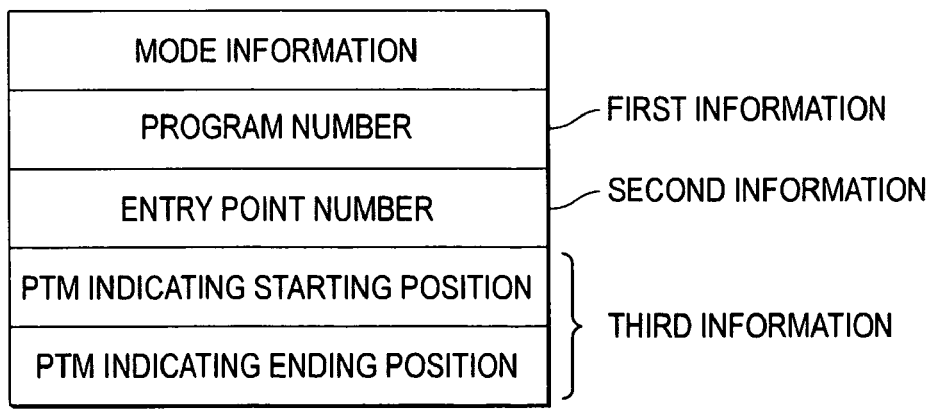

Moreover, when the entire DVD is a target, the reproduction range information is composed of first information indicating a program number of the original program chain, second information indicating an entry point number in a program of the original program chain, third information having a starting position and an ending position of the program indicated by the first information as time information (which is represented by PTM), and mode information indicating which of the first to third information is used, as shown in FIG. 4C.

Therefore, in the above-mentioned reproduction range information, when the mode information indicates the first information, a target repeatedly reproduced as a moving picture becomes a program (or a program chain) indicated by the first information. When the mode information indicates the second information, a target repeatedly reproduced as a moving picture is an entry point indicated by the second information in a program (or a program chain) indicated by the first information. In addition, when the mode information indicates the third information, a target repeatedly reproduced as a moving picture becomes a range from the starting position to the ending position in the third information. Thus, when the mode information indicates the first information, the second information and the third information are not used. When the mode information indicates the second information, the third information is not used. In addition, when the mode information indicates the third information, the second information is not used.

A supplementary explanation will be given below.

Figure 10:
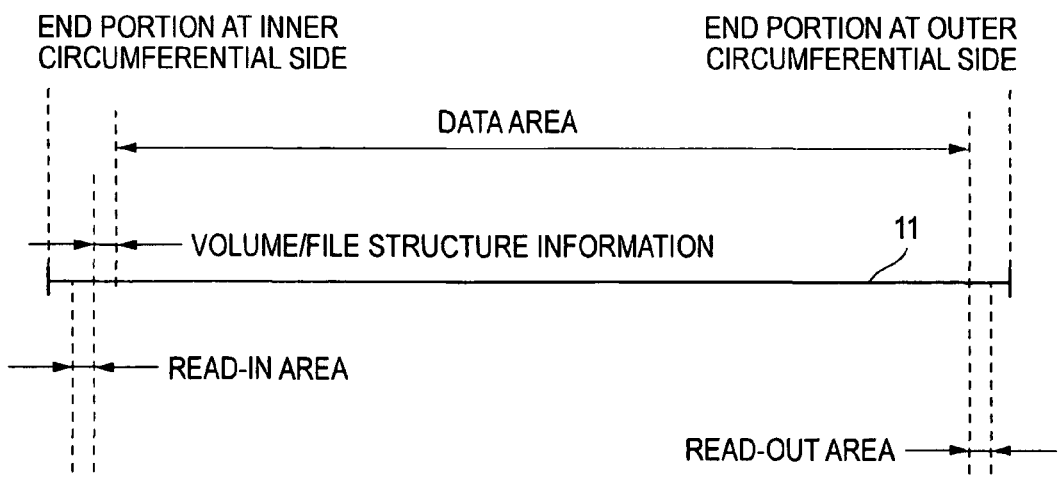
FIG. 10 is an explanatory diagram illustrating an area where data is recorded in a VR format.
Figure 11:
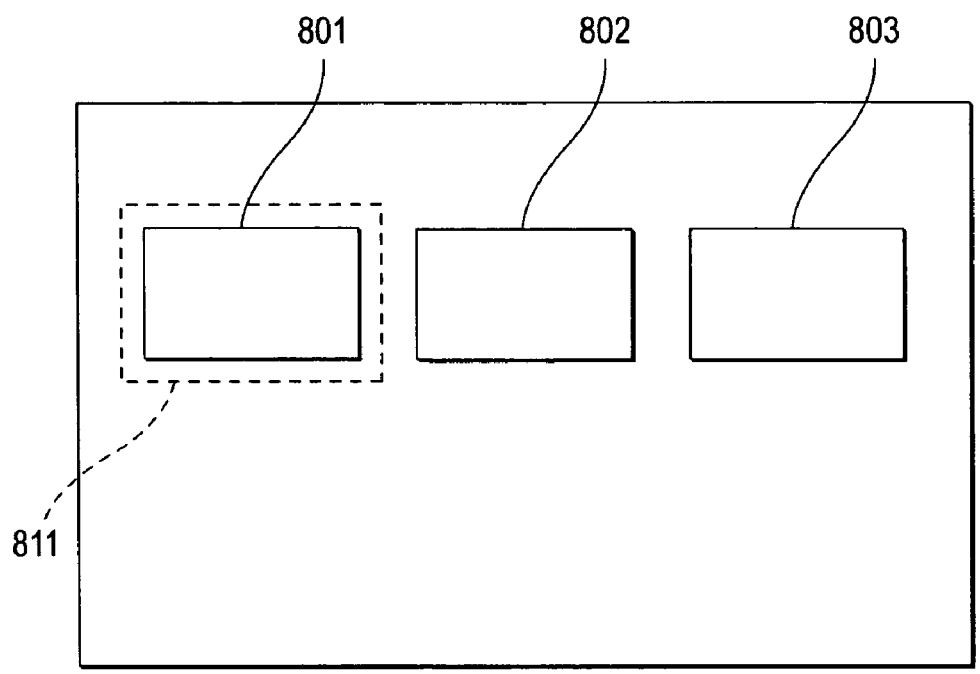
FIG. 11 is an explanatory diagram illustrating a screen having a plurality of thumbnail images (representative images) displayed thereon.
Figure 12:
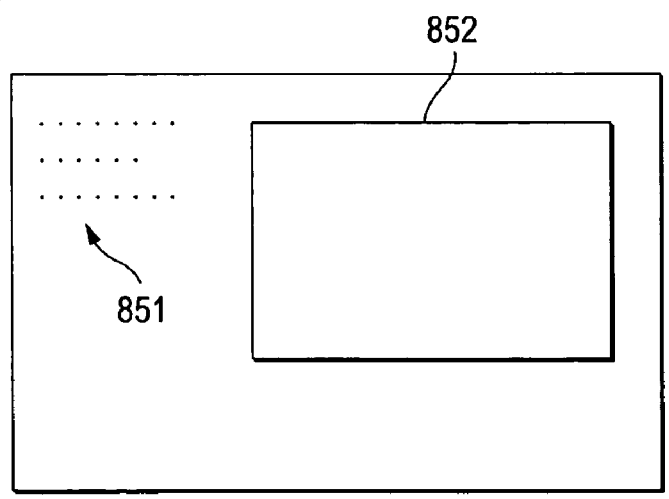
FIG. 12 is an explanatory diagram illustrating a screen having the entire information of the DVD displayed thereon.

FIG. 10 shows an information-recorded area of a DVD 11 in the VR format. In FIG. 10, a read-in area is provided at an innermost circumferential side of the DVD 11. In addition, an area for storing volume/file structure information is provided at an outer circumferential side coming into contact with the read-in area. Further, at the outer circumferential side of this area, a data area is provided to record the main information, such as image signals. The volume/file structure information is information indicating the relationship among a hierarchy structure, data, and the recorded position of the data. Therefore, by referring to the volume/file structure information, it is possible to know which kind of data is used and which area is empty.

Figure 9:
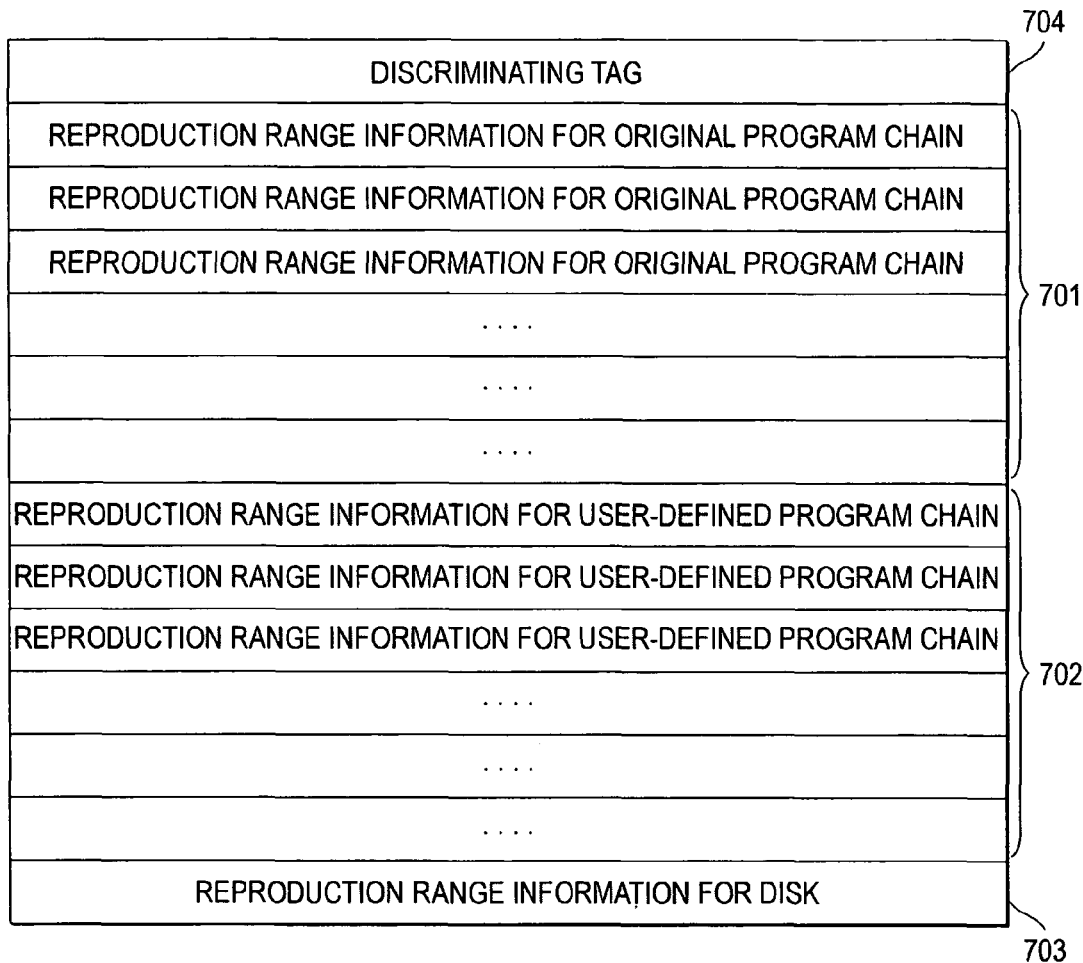
FIG. 9 is an explanatory diagram illustrating an arrangement of the reproduction range information recorded on the DVD.

Returning to the description of the reproduction range information again, FIG. 9 shows a data structure when the reproduction range information is recorded on the DVD 11. That is, reproduction range information 701 whose target is the original program chain, reproduction range information 702 whose target is the user-defined program chain, and reproduction range information 703 whose target is the entire DVD are defined as data having one film format. In addition, these information items are recorded on a predetermined area of the data area of the DVD, with a discriminating tag 704, which is information discriminated from other data, added thereto (the predetermined area where the reproduction range information is recorded is an area in the vicinity of the inner circumferential side, which is an area having a high probability of being empty in various types of storage media (which do not use the reproduction range information) to which the present invention is not applied). However, an area having the reproduction range information therein is represented by an empty area in the volume/file structure information.

That is, the reproduction range information is not seen as far as the volume/file structure information is referred and can be obtained by reading out a predetermined area without referring to the volume/file structure information. Therefore, when a DVD having the reproduction range information thereon is reproduced by an apparatus not using the reproduction range information, the reproduction range information is ignored. Thus, the apparatus not using the reproduction range information can reproduce the DVD having the reproduction range information recorded thereon without any difficulty. As a result, it is possible to obtain compatibility with an apparatus not using the reproduction range information.

Figure 3:
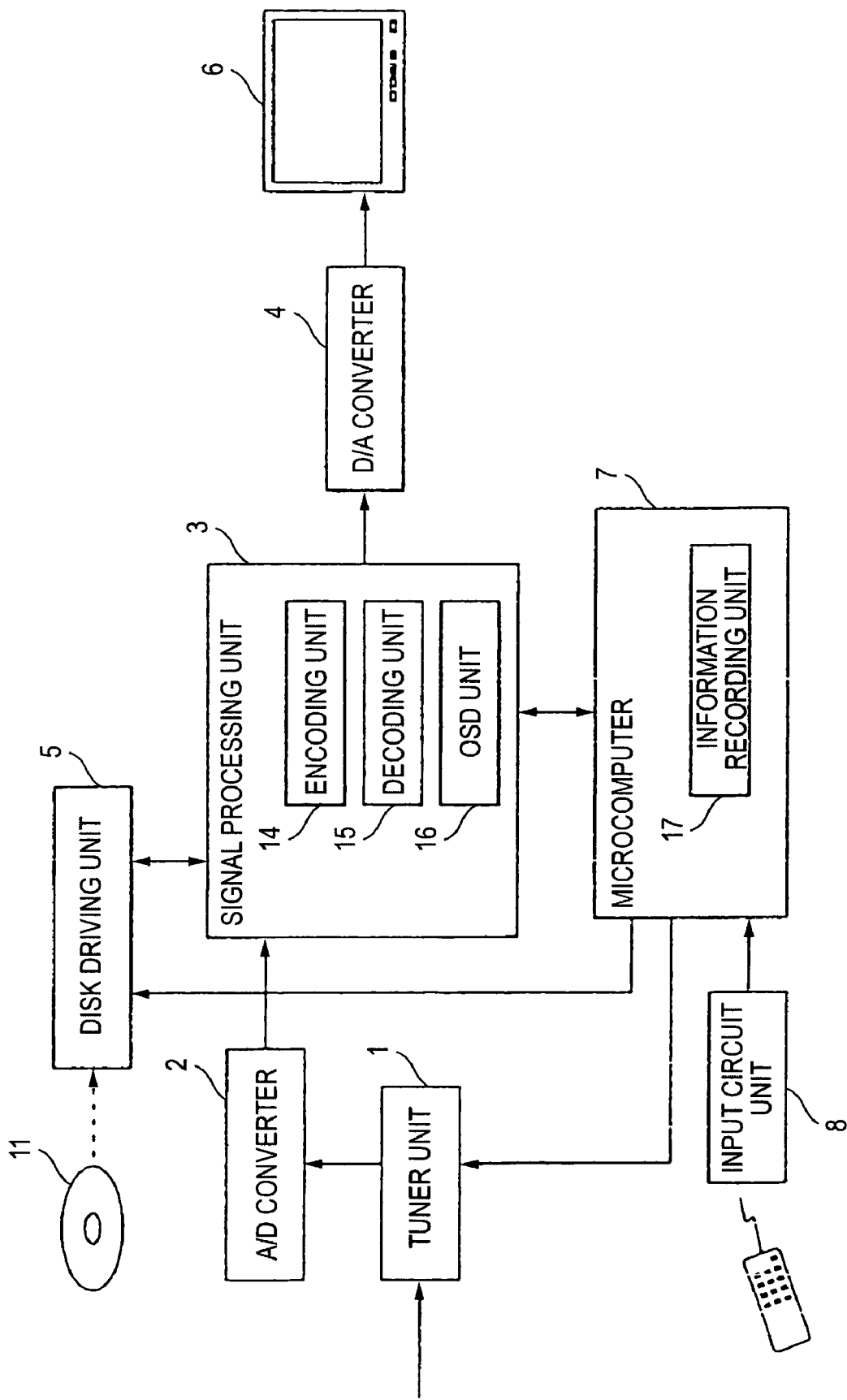
FIG. 3 is a block diagram illustrating an electrical structure of the recording and reproducing apparatus according to the present embodiment.

FIG. 3 is a block diagram illustrating the electrical structure of a recording and reproducing apparatus according to an embodiment of the invention, and more particularly, shows a DVD recorder. In addition, hereinafter, it is considered that image signals include voice signals.

A tuner unit 1 receives commercial broadcasting signals through a channel defined by a microcomputer 7 and outputs the received analog image signals to an A/D converter 2. The A/D converter 2 converts the analog image signals output from the tuner unit 1 into digital signals and output them to a signal processing unit 3. A D/A converter 4 converts the digital image signals output from the signal processing unit 3 into the analog image signals and outputs them to a television set 6 provided at the outside.

A disk driving unit 5 records signals obtained by, for example, encoding the digital signals (including reproduction range information or image signals in the VR format) output from the signal processing unit 3 on a DVD (for example, an optical disk, and more particularly, DVD-RW, DVD+RW, or DVD-RAM) 11. In addition, the digital signals (including reproduction range information or image signals in the VR format) recorded on the DVD 11 are read out, and a decoding process, a correcting process, etc., are performed thereon. Then, the signals are output to the signal processing unit 3.

The signal processing unit 3 compresses the image signals output from the A/D converter 2 according to the MPEG2 standard using an encoding unit 14. Then, the compressed image signals are processed based on the VR format and are then output to the disk driving unit 5. In addition, the image signals output from the disk driving unit 5 are decoded by a decoding unit 15 based on the VR format, and the decoded signals are expanded according to the MPEG2 standard. Then, the expanded digital image signals are output to the D/A converter 4.

Further, the signal processing unit 3 generates signals indicating characters or symbols instructed by the microcomputer 7, using an on-screen display unit (hereinafter, referred to as an OSD unit) 16, and then overlaps the signals with the image signals. In addition, when the reproduction range information is included in the signals output from the disk driving unit 5, the reproduction range information is extracted and is then output to the microcomputer 7.

Furthermore, when the microcomputer 7 instructs the signal processing unit 3 to display thumbnail images (representative images) indicating the contents of the image signals recorded on the DVD 11, the signal processing unit 3 generates image signals indicating the thumbnail images and outputs them. In addition, in the display of the thumbnail images, when it is instructed to use one of the thumbnail images as a moving picture, the instructed thumbnail is used as a moving picture.

An input circuit unit 8 includes a light receiving unit for receiving infrared signals transmitted from a remote controller 9 or a key switch, such as a power key, provided on a front panel of a main body of an apparatus (not shown). When the instructions of a user are input thereto, the input circuit unit 8 outputs the input instructions to the microcomputer 7.

The microcomputer 7 controls the main operations of a DVD recorder. That is, the microcomputer 7 controls the channel received by the tuner unit 1 according to the instructions of the user input through, for example, the remote controller 9. In addition, the microcomputer 7 controls the disk driving unit 5 and the signal processing unit 3 to record a broadcasting program received by the tuner unit 1 on the DVD 11 as image signals in the VR format and to reproduce the image signals recorded on the DVD 11 in the VR format to display them on the television set 6. When the user inputs, to the remote controller 9, an instruction to display the thumbnail images indicating the contents of the image signals recorded on the DVD 11, the signal processing unit 3 generates image signals indicating the thumbnail images and outputs them.

An information recording unit 17 (which is constituted to perform a portion of a function of the microcomputer 7) reproduces reproduction range information (see FIGS. 4A to 5B), based on the instructions input by the user, when the image signals recorded on the DVD 11 are reproduced. Then, the information recording unit 17 controls the signal processing unit 3 and the disk driving unit 5 to record the generated reproduction range information on a predetermined area of the data area of the DVD 11. In addition, in the volume/file structure information, the area where the reproduction range information is recorded is considered as an empty area. Therefore, even after the reproduction range information is recorded in the predetermined area of the data area, the volume/file structure information is maintained to the same contents as those before the reproduction range information is recorded.

Further, when the DVD 11 moves to a reproducing position, the microcomputer 7 controls the signal processing unit 3 and the disk driving unit 5 to previously read out the reproduction range information from the predetermined area, which is a storage area of the reproduction range information, and stores the read information therein. Then, when an instruction to use one of the thumbnail images as a moving picture is input by the user at the time of the display of the thumbnail images (representative images), the microcomputer 7 reproduces the DVD 11 based on the reproduction range information corresponding to the instructed thumbnail image and changes the instructed thumbnail image from a still picture into a moving picture (the reproduction range information corresponding to the thumbnail image means reproduction range information in which the program or program chain indicated by the first information is a title (program or program chain) corresponding to the thumbnail image).

Furthermore, in a state in which the entire information (information on the date and time where the image signals are recorded, the name of the DVD 11, the still picture indicating the representative image, etc.) of the DVD 11 is displayed on the television set 6, when an instruction to change a still picture into a moving picture is input, the microcomputer 7 reproduces the DVD 11 based on the reproduction range information (see FIG. 4C) corresponding to the disk to change the still picture displayed on a screen which indicates the entire information of the disk into the moving picture.

Figure 1:
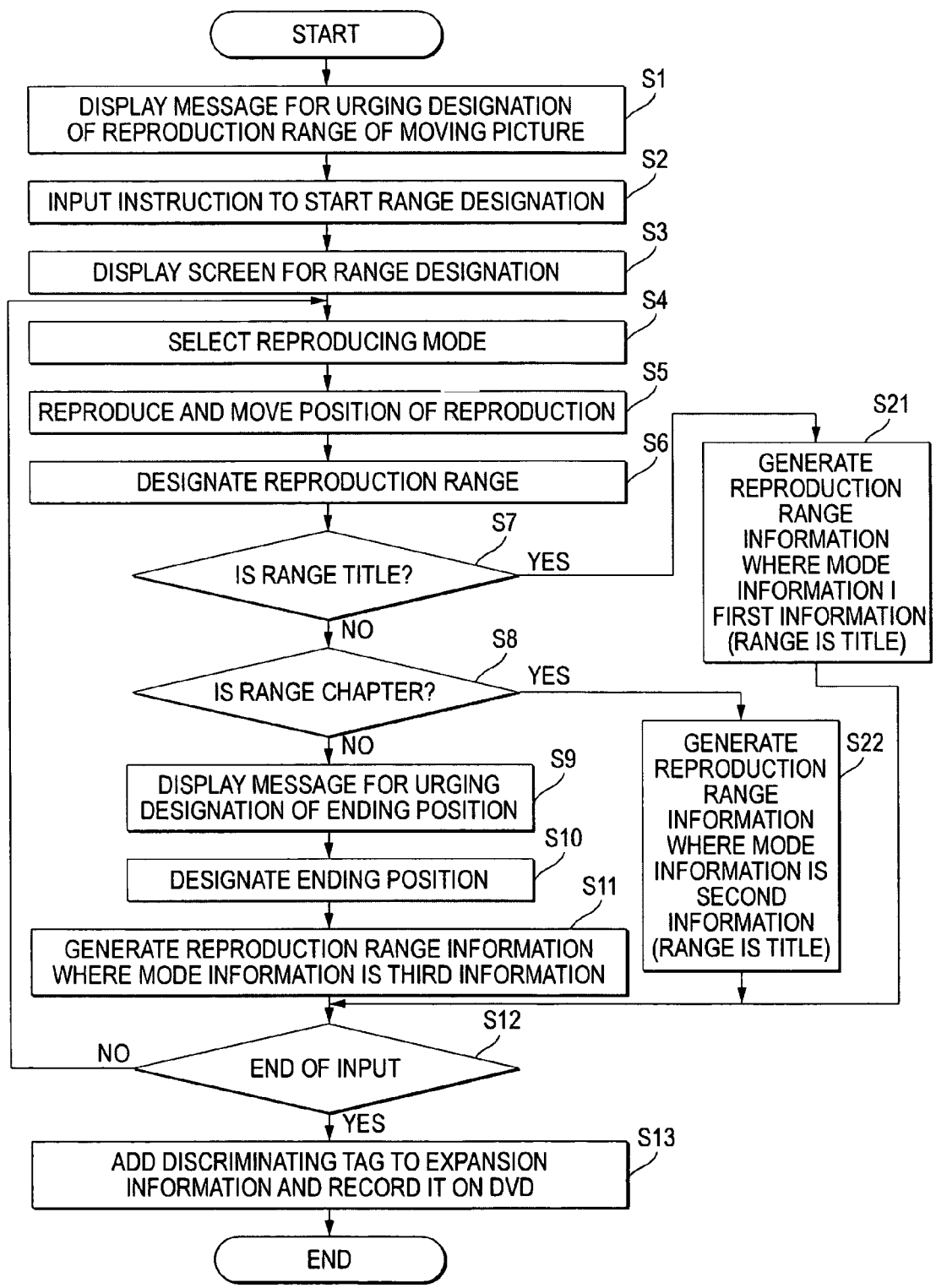
FIG. 1 is a flow chart illustrating main operations when a recording and reproducing apparatus according to an embodiment of the invention generates and records reproduction range information.

FIG. 1 is a flow chart illustrating the main operations when reproduction range information is generated and recorded according to an embodiment. An operation of generating and recording the reproduction range information will be described with reference to FIG. 1, if necessary.

In the present embodiment, in order to change the still picture (representative image) into the moving picture in the thumbnail display, it is necessary to previously generate reproduction range information indicating a reproduction range where the moving picture is reproduced and to record the generated information on the DVD 11. Therefore, the information recording unit 17 reads out an area previously set as a storage area of the reproduction range information on the DVD 11 to determine whether the reproduction range information has been already recorded thereon (the operation is terminated when the reproduction range information has been already recorded thereon).

Figure 5A:
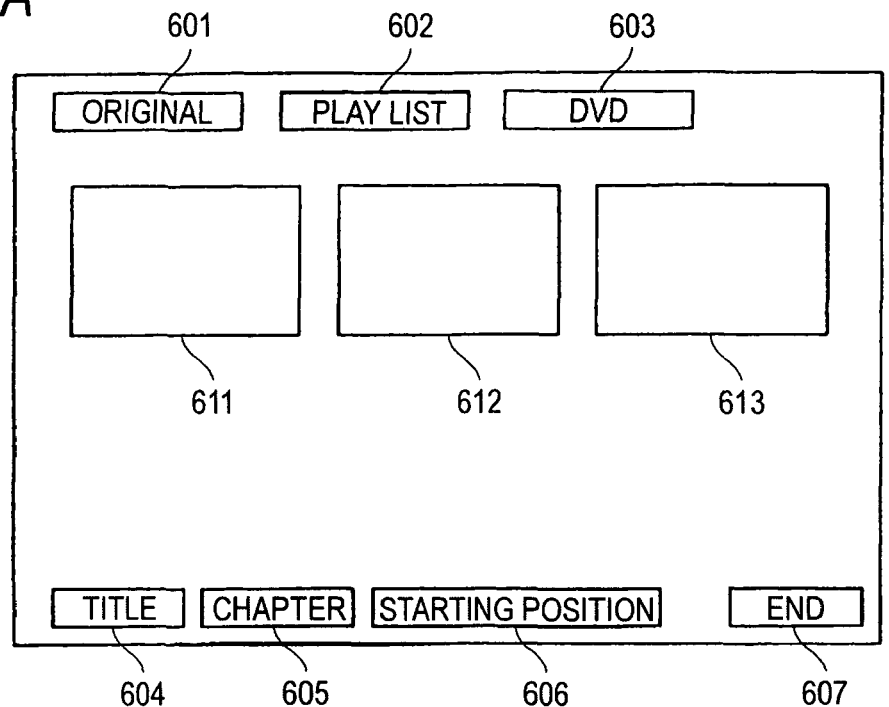
FIGS. 5A and 5B are explanatory diagrams illustrating a screen for designating the reproduction range of a moving picture.

When the reproduction range information has been read out, the information recording unit 17 displays a message for urging to designate the reproduction range of a moving picture on the television set 6 in order to generate and record the reproduction range information (step S1). When the user inputs an instruction to start designating the range in response to the message, an initial screen for designating the range is displayed on the television set 6, as shown in FIG. 5A (steps S2 and S3).

In order for the user to rapidly designate the reproduction range of the moving picture, when following the original program chain (when a cursor is located at an 'original' button 601 and then a decision key is operated), thumbnail images (representative images) 611 to 613 respectively corresponding to programs in the original program chain are displayed on the initial screen. In addition, when following the user-defined program chain (when the cursor is located at a 'play list' button 602 and then the decision key is operated), the thumbnail images 611 to 613 respectively corresponding to program chains in the user-defined program chain are displayed on the initial screen.

Further, in the case of a screen for designating the reproduction range of the moving picture displayed on the screen indicating the entire information of the DVD 11 (when the cursor is located at a 'DVD' button 603 and then the decision key is operated), the thumbnail images 611 to 613 respectively corresponding to programs in the original program chain are displayed, similar to the case of the original program chain.

Figure 5B:
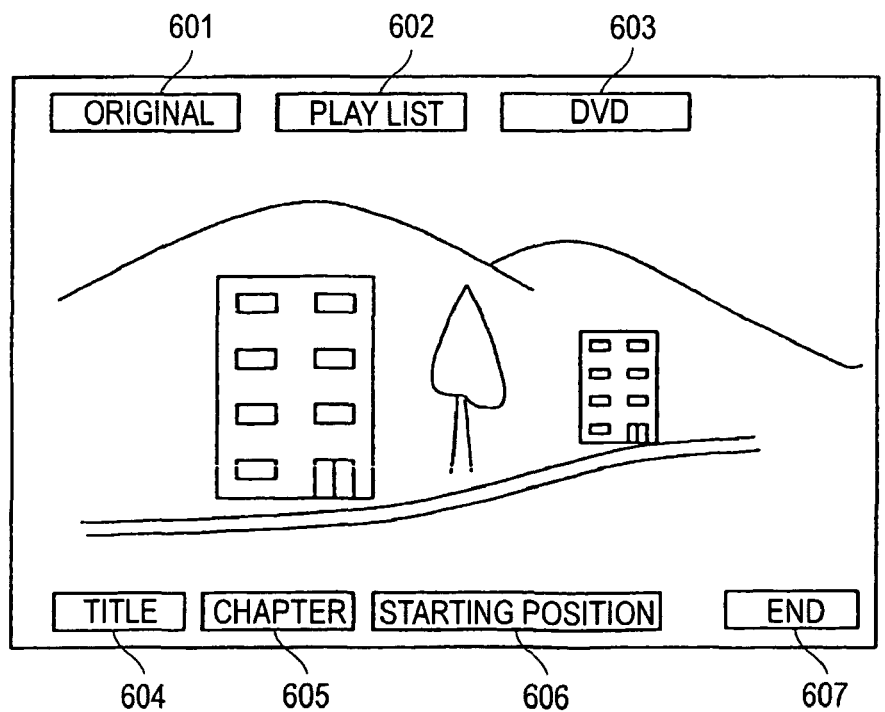

Therefore, one of the 'original' button 601, the 'play list' button 602, and the 'DVD' button 603 is selected to select a reproducing mode (step S4). Then, when a reproduction position is designated, for example, by selecting one of the thumbnail images 611 to 613 using the cursor, reproduction starts at the designated position, and the screen shown in FIG. 5B is displayed on the television set 6 (step S5). In this state, when the cursor is moved to a 'title' button 604 and then the decision key is operated, the reproduction range information in which the program (or the program chain) currently being reproduced is the reproduction range of a moving picture is reproduced (steps S6, S7, and S21). Meanwhile, when the cursor is moved to a 'chapter' button 605, not the 'title' button 604, and then the decision key is operated, the reproduction range information in which a cell of the program (or a cell of the program chain) currently being reproduced is the reproduction range of a moving picture is reproduced (steps S6 to S8 and S22).

Further, when the cursor is moved to a 'starting position' button 606 and then the decision key is operated, a message (not shown) for urging to designate an ending position is displayed (steps S6 to S9). Thereafter, in a case in which an area suitable for the ending position in the reproduction range of the moving picture is reproduced by continuously performing reproduction or by moving the reproducing position to the rear side, when the decision key is operated, reproduction range information is generated in which a reproducing position at that time is the ending position and in which the reproducing position when the cursor is located at the 'starting position' button 606 and then the decision key is operated in step S6 is a stating position (steps S10 and S11).

The process proceeds from step S12 to step S4 to continuously perform the input of the range designation. The, the same operation as described above is repeatedly performed to generate the reproduction range information. Further, in step S4, when the cursor is located at the 'play list' button 602 and then the decision key is operated, the DVD 11 is reproduced according to the play list, and the reproduction range information when the thumbnail image is the moving picture at the time of reproduction is generated according to the play list. In addition, in step S4, when the cursor is located at the 'DVD' button 602 and then the decision key is operated, the DVD 11 is reproduced according to the original program chain, and the reproduction range information when the still picture displayed on the screen indicating the entire information of the DVD 11 is the moving picture is generated according to the original program chain.

When the range designation is completed, the process proceeds from step S12 to step S3. Then, among the reproduction range information that has been already generated, the information recording unit 17 integrates an information group 701 composed of the reproduction range information for the original program chain, an information group 702 composed of the reproduction range information for the user-defined program chain, and reproduction range information 703 for the main body of the DVD into data having one file format, and adds discriminating data 704 to the integrated data. Then, the information recording unit 17 records the added data in a predetermined area of the data area of the DVD 11.

Figure 6:
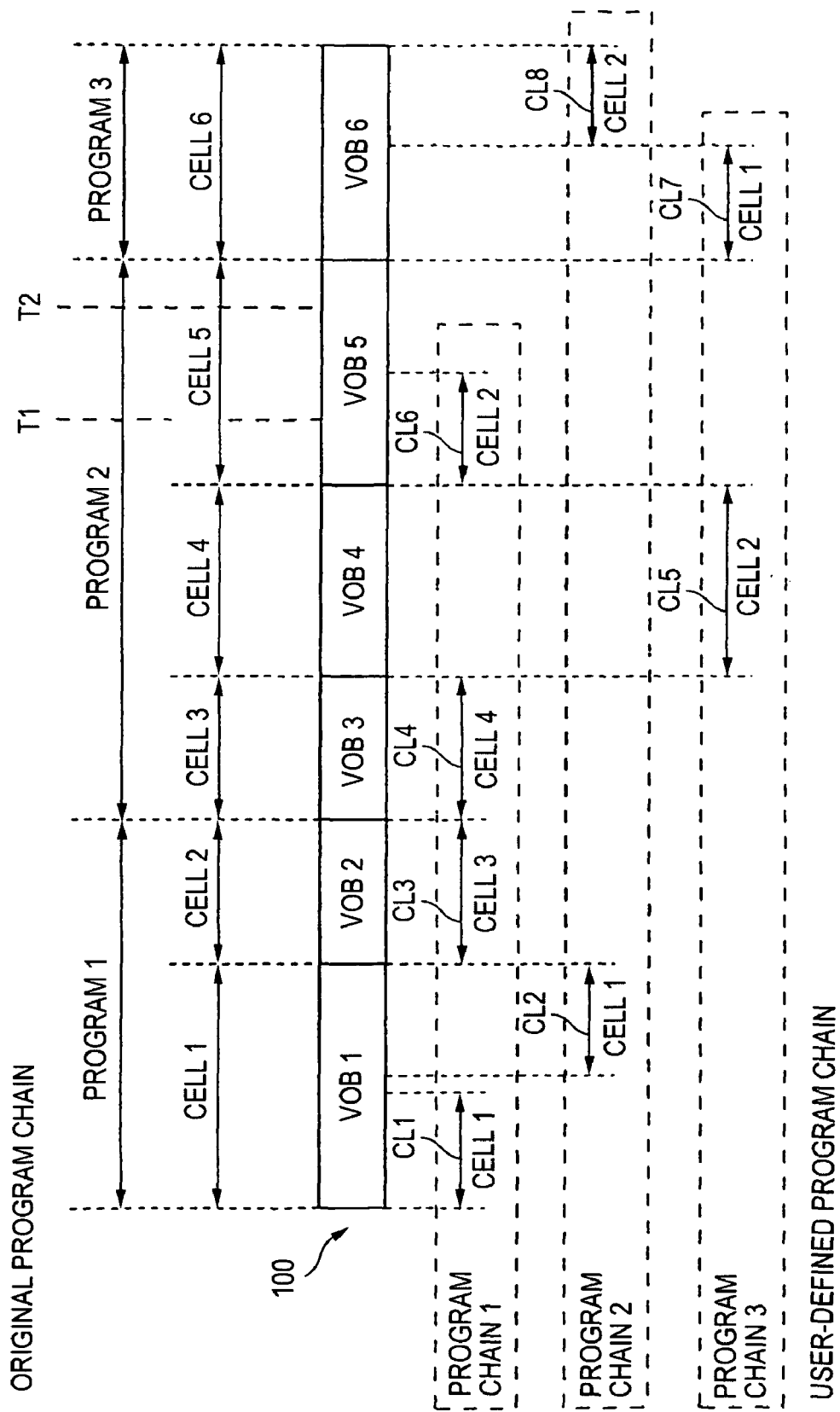
FIG. 6 is an explanatory diagram illustrating an example of an image signal recorded on a DVD (optical disk)

More specifically describing the reproduction range information, first, an image signal (which is composed of six video objects VOB1 to VOB6) represented by reference numeral 100 in FIG. 6 is recorded on the DVD. Further, in the original program chain, the image signal 100 is divided so as to correspond to cell Nos. 1 to 6. Among the cell Nos. 1 to 6, the cell Nos. 1 and 2 constitute a program No. 1, and the cell Nos. 3 to 5 constitute a program No. 2. In addition, the cell No. 6 constitutes a program No 3.

Meanwhile, in the user-defined program chain, the image signal 100 is divided so as to correspond to eight cells CL1 to CL8. Four cells CL1, CL2, CL4, and CL6 constitute the program No. 1, and two cells CL2 and CL8 constitute the program No. 2. In addition, two cells CL5 and CL7 constitute the program No. 3.

Hereinafter, it will be described the reproduction range information created when the original program chain and the user-defined program chain have the above-mentioned contents.

In a case in which reproduction is performed according to the original program chain in step S5, at the time when the cell No. 1 or 2 is reproduced, when the 'title' button 604 is selected, it is generated the reproduction range information shown in FIG. 7A, that is, the reproduction range information indicating the first program as a reproduction range. In addition, at the time when the cell No. 2 is reproduced, when the 'chapter' button 605 is selected, it is generated the reproduction range information shown in FIG. 7B, that is, the reproduction range information indicating the program No. 2 as a reproduction range.

Further, when a position of the program No. 2 represented by reference numeral T1 is reproduced, the 'starting position' button 606 is operated, and the ending position is designated when a position represented by reference numeral T2 is reproduced. In this case, it is generated the reproduction range information shown in FIG. 7C, that is, the reproduction range information in which T1 is designated as the starting position and T2 is designated as the ending position. In addition, the starting position and the ending position are limited to be located in the same program (or the same program chain). However, when the reproduction range information is located over a plurality of programs (or a plurality of program chains), the reproduction range information becomes unavailable.

Furthermore, in a case in which reproduction is preformed according to the user-defined program chain in step S5, when the 'title' button 604 is selected at the time when the cell CL5 is reproduced, it is generated the reproduction range information shown in FIG. 8A, that is, the reproduction range information designating the program No. 3 as a reproduction range. In addition, when the 'title' button 604 is selected at the time when the cell CL5 is reproduced, it is generated the reproduction range information shown in FIG. 8B, that is, the reproduction range information designating the cell No. 2 of the program No. 3 as a reproduction range (in the following description, it is considered that the reproduction range information shown in FIG. 8A is not generated and that the reproduction range information shown in FIG. 8B is generated).

Figure 2:
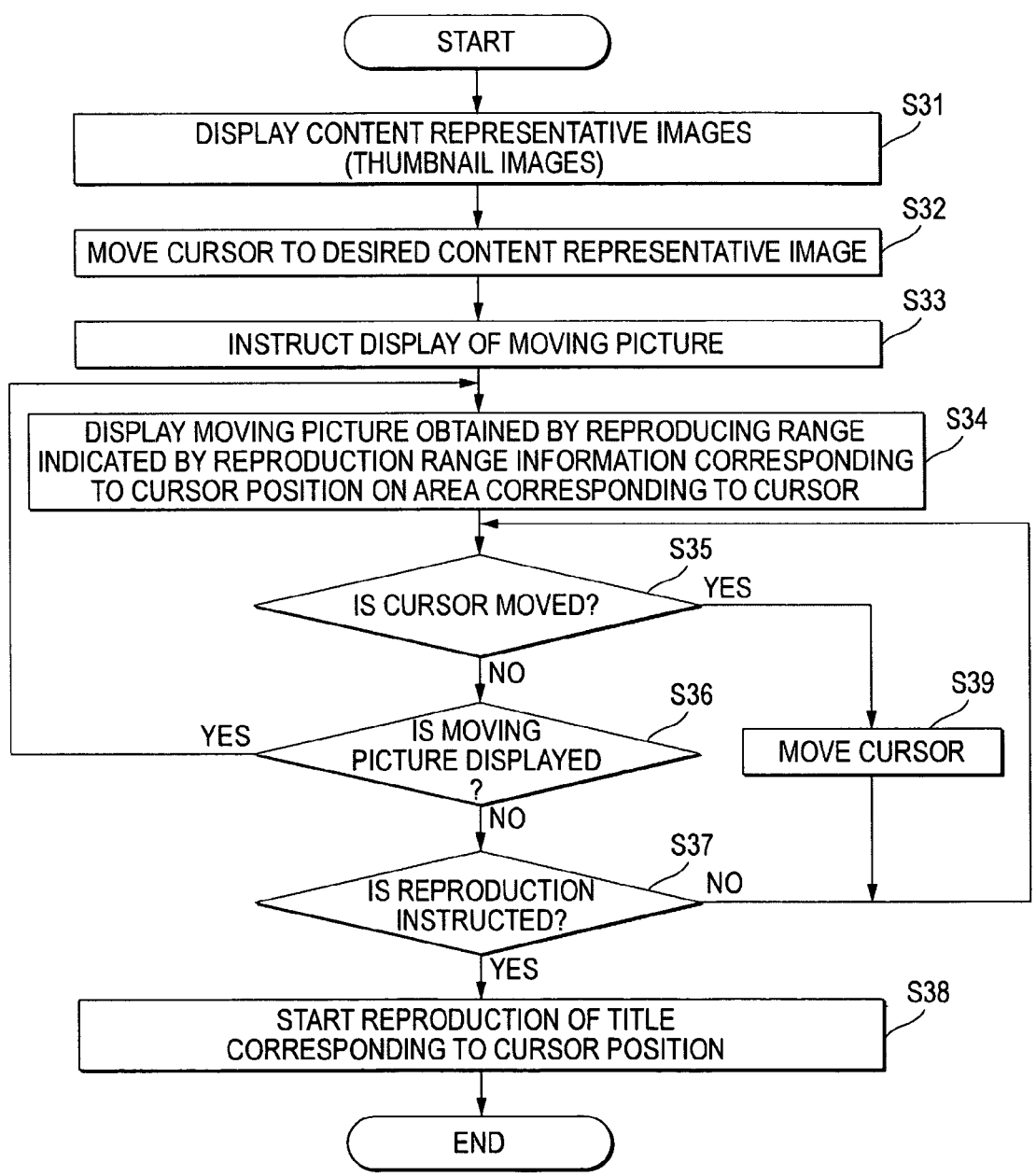
FIG. 2 is a flow chart illustrating the main operations when a moving picture is displayed on a screen on which thumbnail images (representative images) are displayed.

FIG. 2 is a flow chart illustrating the main operation when a moving picture is displayed on a display screen of thumbnail images according to the present embodiment. A process of reproducing the moving picture referring to reproduction range information will be described with reference to FIG. 2, if necessary.

First, it is assumed that the image signals are recorded on the DVD 11 as shown in FIG. 6, and the reproduction range information recorded on the DVD 11 is read out and then stored in the microcomputer 7. In addition, it is assumed a state in which the image signals recorded on the DVD 11 are reproduced according to the play list (the user-defined program chain).

In this state, when an instruction is input to display thumbnail images (representative images), an image shown in FIG.

11 is displayed on the television set 6. That is, still pictures (representative images) 801 to 803 respectively representing three titles (program chain Nos. 1 to 3) are displayed (step S31). In this state, a cursor 811 is moved to the still picture 803 (step S32).

Then, when an instruction to display a moving picture is input through the remote controller 9, the microcomputer 7 performs reproduction referring to the reproduction range information corresponding to the position of the cursor 811 (the position of the program No. 3 represented by reference numeral 803), that is, the reproduction range information shown in FIG. 8B. Therefore, the cell No. 2 of the program No. 3 starts to be reproduced, and the cell No. 2 of the program No. 3 is reproduced as a moving picture having a reduced size at the position (an area 803) of the cursor 811 (which located at the area 803) (steps S33 and S34). Subsequently, a loop operation composed of steps S35 to S37 is performed. That is, it is determined whether an instruction to move the cursor is input, whether an instruction to display a moving picture is input, and whether an instruction to perform reproduction is input. When an additional instruction is not input, the reproduction of the cell No. 2 is repeatedly performed.

Thereafter, when the instruction to perform reproduction is input, the moving picture displayed on the area 803 in a reduced size is displayed on the entire screen of the television set 6 as a reproduction image having a normal size. That is, in a state in which the cursor is located at the area where the moving picture is reproduced, when the instruction to perform reproduction is input, the moving picture displayed in the reduced size is continuously reproduced, thereby displaying a reproduction image having a normal size.

Meanwhile, in the above-mentioned loop operation, when the instruction to perform reproduction is input after a key operation for moving the cursor 811 on the still picture 801 is input through the remote controller 9 (steps S35 and S39), the reproduction of the program chain No. 1, which is a title corresponding to the still picture 801, starts (steps S37 and S38). In addition, when the instruction to display a moving picture is input after the key operation for moving the cursor 811 on the still picture 801 is input through the remote controller 9 (step S41), the range indicated by one of the reproduction range information items for the user-defined program chain whose first information has a value (a program chain number) of '1' is reproduced, and the reproduced moving picture is displayed in the area 801 in a reduced sized (steps S36 and S34).

The above-mentioned operation is performed when reproduction is performed according to the user-defined program chain. In a case in which reproduction is performed according to the original program chain, when the instruction to display a moving picture is input, the reproduction range information for the original program chain is referred in step S34. Therefore, in this case, when the instruction to display a moving picture is input with the cursor 802 located at the area 802, the reproduction range information whose first information has a value (a program number) of '2'. That is, the reproduction range information shown in FIG. 7C is referred. Thus, the range from the starting position T1 to the ending position T2 is repeatedly reproduced, and the reproduced moving picture is displayed in the area 802 in a reduced size.

In addition, the invention is not limited to the above-mentioned embodiment. That is, in the above-mentioned embodiment, the reproduction range information is recorded in a predetermined area, but the recording position of the reproduction range information is not limited thereto. For example, the following structures can be used.

That is, when the reproduction range information is recorded, the information recording unit 17 examines a section located at the innermost circumferential side of an empty area, referring to the volume/file structure information, and then records the reproduction range information in the section located at the innermost circumferential side of the empty area. Therefore, even if the reproduction range information is recorded, volume/file structure information after the reproduction range information is recorded is maintained similar to volume/file structure information before the reproduction range information is recorded since the area where the reproduction range information is recorded is considered as an empty area in the volume/file structure information.

Further, when reproduction range information is read from the DVD 11, a reproduction range information display unit 18 checks an empty area located at the innermost circumferential side, referring to the volume/file structure information. Then, the reproduction range information display unit reads information from the empty area located at the innermost circumferential side and then stores the read reproduction range information therein. In the reading operation, when the reproduction range information is not readout, it is determined that the reproduction range information is not recorded.

When the recording position of the reproduction range information is determined in the above-mentioned method, an empty area for recording the reproduction range information is surely found even when the reproduction range information is recorded on the DVD 11 having image signals recorded thereon by an apparatus not concerned with the present invention. Therefore, it is possible to obtain high compatibility with different apparatuses.

What is claimed is:

1. An apparatus, comprising:
a recorder, operable to generate reproduction range information and to record the reproduction range information on a recording medium; and
a reproducer, operable to perform either a reproduction of image data recorded on the recording medium according to a VR format or a display of a representative image representatively showing a content of the image data in accordance with the reproduction range information, wherein:
the reproduction range information includes at least one of:
first information, designating at least one of a program of an original program chain and a program chain of a user-defined program chain;
second information, designating an entry point of at least one of a program of an original program chain and a program chain of a user-defined program chain;
third information, designating a first time point that the reproduction is begun and a second time point that the reproduction is finished; and
mode information, designating one of the first information, the second information and the third information;
the reproducer is operable to reproduce a moving image corresponding to a part of the image data designated by the first information as the representative image, in a case where the mode information designates the first information;
the reproducer is operable to reproduce a moving image corresponding to a part of the image data designated by the second information as the representative image, in a case where the mode information designates the second information; and
the reproducer is operable to reproduce a moving image corresponding to a part of the image data designated by the third information as the representative image, in a case where the mode information designates the third information, wherein the representative image is displayed as a still picture and is changed to a moving picture in response to user instructions, and wherein the representative image is a moving picture having a reduced size.

2. The apparatus according to claim 1, wherein:

the recorder is operable to record the reproduction range information at an area which is regarded as an empty area according to a volume/file structure information which indicates a usage state of a data area of the recording medium.

3. The apparatus according to claim 1, wherein:

the representative image is a thumbnail image of the image data.

4. The apparatus according to claim 1, wherein:

the recording medium is an optical disk.

5. The apparatus according to claim 4, wherein:

the recorder is operable to record the reproduction range information at an innermost area of the optical disk which is regarded as an empty area according to a volume/file structure information which indicates a usage state of a data area of the optical disk.

\* \* \* \* \*